US009332530B2

(12) United States Patent
Iwamura et al.

(10) Patent No.: US 9,332,530 B2
(45) Date of Patent: *May 3, 2016

(54) MOBILE COMMUNICATION METHOD AND MOBILE STATION

(75) Inventors: Mikio Iwamura, Tokyo (JP); Hideaki Takahashi, Tokyo (JP); Wuri Andarmawanti Hapsari, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 122 days.

This patent is subject to a terminal disclaimer.

(21) Appl. No.: 13/990,286

(22) PCT Filed: Nov. 17, 2011

(86) PCT No.: PCT/JP2011/076549
§ 371 (c)(1),
(2), (4) Date: Jul. 22, 2013

(87) PCT Pub. No.: WO2012/073715
PCT Pub. Date: Jun. 7, 2012

(65) Prior Publication Data
US 2013/0294396 A1   Nov. 7, 2013

(30) Foreign Application Priority Data

Nov. 30, 2010   (JP) ................................ P2010-266246

(51) Int. Cl.
*H04W 72/04*   (2009.01)
*H04W 48/02*   (2009.01)

(52) U.S. Cl.
CPC .............. *H04W 72/04* (2013.01); *H04W 48/02* (2013.01)

(58) Field of Classification Search
CPC ................... G06F 21/6218; G06F 2221/2113; G06F 2221/2141; G06F 9/4428; G06F 9/468; H04M 2203/1091; H04M 2207/206; H04M 3/42229; H04W 8/18; H04W 72/04; H04W 48/02

See application file for complete search history.

(56) References Cited

U.S. PATENT DOCUMENTS

| 8,565,260 | B2* | 10/2013 | Kwon et al. .................. 370/464 |
| 8,848,641 | B2* | 9/2014 | Fong et al. .................... 370/329 |
| 2011/0103310 | A1* | 5/2011 | Stojanovski et al. ......... 370/328 |

OTHER PUBLICATIONS

3GPP TS 36.331 V9.4.0 (Sep. 2010).*
International Search Report issued in PCT/JP2011/076549 mailed on Jan. 17, 2012 (2 pages).
NTT Docomo, Inc.; "Restriction of AC barring parameter setting"; 3GPP TSG-RAN WG2 Meeting #72, R2-106633; Jacksonville, FL, USA; Nov. 15-19, 2010 (3 pages).
Ericsson, ST-Ericsson; "Indicators for MTC Support"; 3GPP TSG-RAN WG2 #72, Tdoc R2-106460; Jacksonville, USA; Nov. 15-19, 2010 (3 pages).

(Continued)

*Primary Examiner* — Ayaz Sheikh
*Assistant Examiner* — Debebe Asefa
(74) *Attorney, Agent, or Firm* — Osha Liang LLP

(57) ABSTRACT

A mobile communication method according to the present invention includes: a step A of broadcasting, by a radio base station eNB, "ac-Barring For TYPE x" for barring an access by each type of an EPS bearer in a subordinate cell; and a step B of determining, by a mobile station UE, whether an originating call request is transmitted or not depending on whether the "ac-Barring For TYPE x" corresponding to a type of the EPS bearer set to a destination APN of the originating call request in a standby cell is broadcasted or not.

8 Claims, 3 Drawing Sheets

(56) References Cited

OTHER PUBLICATIONS

3GPP TS 36.331 V9.4.0; "3rd Generation Partnership Project; Technical Specification Group Radio Access Network; Evolved Universal Terrestrial Radio Access (E-UTRA); Radio Resource Control (RRC); Protocol specification (Release 9)"; Sep. 2010 (252 pages).

3GPP TS 24.301 V9.4.0; "3rd Generation Partnership Project; Technical Specification Group Core Network and Terminals; Non-Access-Stratum (NAS) protocol for Evolved Packet System (EPS); Stage 3 (Release 9)"; Sep. 2010 (297 pages).

Written Opinion issued in International Application No. PCT/JP2011/076549, dated Jan. 17, 2012 (6 pages).

* cited by examiner

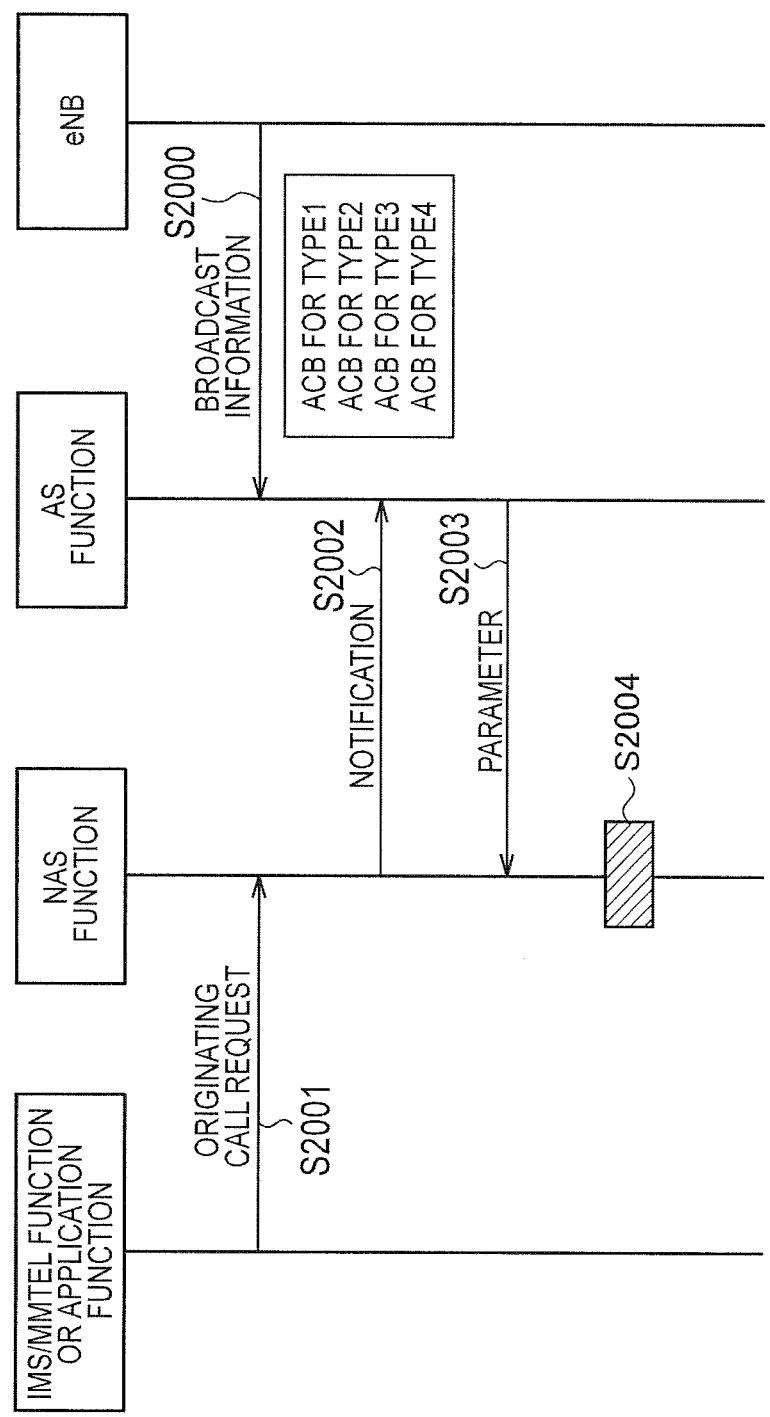

MOBILE COMMUNICATION METHOD AND MOBILE STATION

TECHNICAL FIELD

The present invention relates to a mobile communication method and a mobile station.

BACKGROUND ART

A Release-8 system of an LTE (Long Term Evolution) is configured such that an AS (Access Stratum) function of a mobile station UE determines whether or not an access by the mobile station UE is barred by using "ac-Barring For MO-Data" and "ac-Barring For MO-Signalling" which are broadcasted in a standby cell.

Further, a Release-9 system of an LTE is configured such that an IMS/MMTEL function of the mobile station UE determines whether or not the access by the mobile station UE is barred by using "SSAC (Service Specific AC) For MMTEL-Voice" and "SSAC For MMTEL-Video" which are broadcasted in the standby cell.

Further, a Release-10 system of an LTE is configured such that the AS (Access Stratum) function of the mobile station UE determines whether or not the access by the mobile station UE is barred by using access barring information for CSFB and MTC (Machine Type Communication) access barring information which are broadcasted in the standby cell.

CITATION LIST

Non Patent Literature

[NPL 1] 3GPP TS36.331 v9.4.0
[NPL 2] 3GGP TS24.301 v9.4.0

SUMMARY OF INVENTION

Technical Problem

However, since an access by a mobile station UE cannot be barred for each APN (Access Point Name) and for each service type in a conventional LTE system, there has been a problem that the mobile station UE ends up transmitting an originating call request addressed to the APN even when a fault occurs in a server of a certain APN.

Hereinafter, the APN may be read as PDN (Packet Data Network).

Thus, the present invention has been made in view of the above described problem, and an object thereof is to provide a mobile communication method and a mobile station with which it is possible to appropriately bar the access by the mobile station UE for each service type

Solution to Problem

A first characteristic of the present invention is summarized in that a mobile communication method in a mobile communication system configured to be capable of setting, between a mobile station and a gateway device a service bearer for each access point, comprising: a step A of broadcasting, by a radio base station, type-specific access information for barring an access by each type of the service bearer in a subordinate cell, and a step B of determining, by the mobile station, whether an originating call request is transmitted or not depending on whether the type-specific access information corresponding to a type of the service bearer set to a destination access point of the originating call request is broadcasted or not in the cell.

A second characteristic of the present invention is summarized in that a mobile station configured to be capable of setting a service bearer for each access point between a mobile station and a gateway device, wherein the mobile station is configured to receive type-specific access information for barring an access by each type of the service bearer broadcasted in a standby cell, and is configured to determine whether the originating call request is transmitted or not depending on whether type-specific access information corresponding to a type of a service bearer set to a destination access point of the originating call request in the standby cell is notified or not.

Advantageous Effects of Invention

As described above, according to the present invention, a mobile communication method and a mobile station with which it is possible to appropriately bar an access by the mobile station UE for each service type can be provided.

BRIEF DESCRIPTION OF DRAWINGS

FIG. 4 is a sequence diagram showing the operation of the mobile communication system according to the first modification of the present invention.

DESCRIPTION OF EMBODIMENTS

Mobile Communication System According to First Embodiment of the Present Invention A mobile communication system according to a first embodiment of the present invention will be described with reference to FIGS. 1 to 3.

Figure 1:
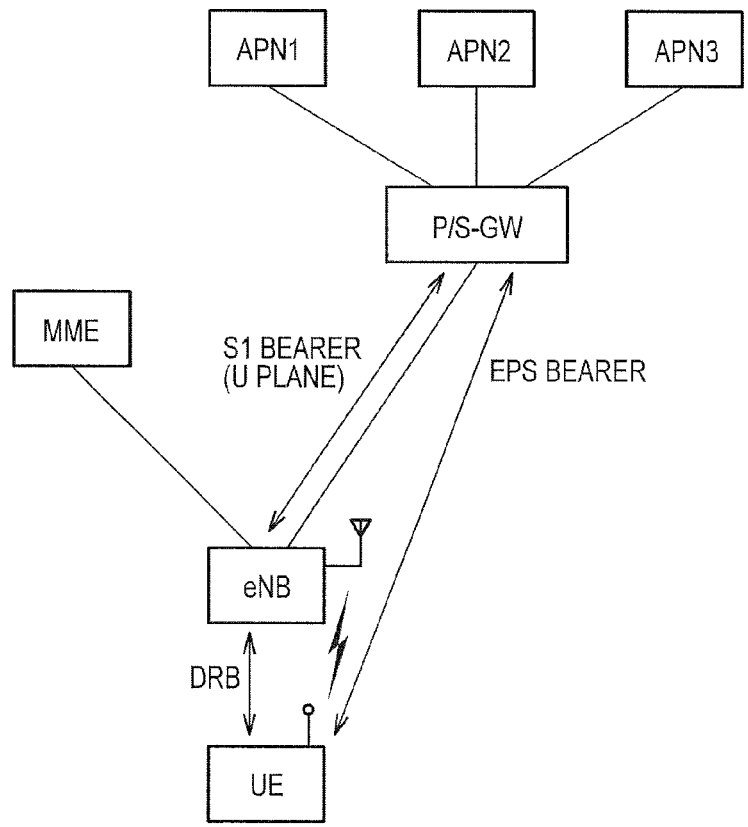
FIG. 1 is a diagram showing the entire configuration of a mobile communication system according to a first embodiment of the present invention.

The mobile communication system according to the present embodiment is a mobile communication system of an LTE-Release 10 system, and, as shown in FIG. 1, includes a gate way device P/S-GW, a mobile management node MME, a radio base station eNB, and a mobile station UE.

The mobile communication system according to the present embodiment is configured to be set with an EPS (Evolved Packet System) bearer for the mobile station UE for each APN between the mobile station UE and the gateway device P/S-GW, and is configured to be set with a radio bearer for the mobile station UE, that is, DRB (Data Radio Bearer, for U-plane) and SRB (Signalling Radio Bearer, for C-plane) for the mobile station UE between the mobile station UE and the radio base station eNB, and also, is configured to be set with an S1 bearer (for U-plane and C-plane) between the radio base station eNB and the gateway device P/S-GW.

Here, the S1 bearer for U-plane may be called as an S1-U bearer, and the S1 bearer for C-plane may be called as an S1-C bearer.

For example, the mobile station UE is configured such that the above described EPS bearer is set when an Attach processing is performed for the mobile management node, and the above described radio bearer and S1 bearer are set when the mobile station UE transits from an idle state to a connected state. Here, the EPS barer, the DRB, and the S1-U bearer correspond one to one with one another.

Further, the radio base station eNB is configured to be capable of broadcasting "ac-Barring (ACB) For TYPE x" for barring the access by each type of an EPS bearer in addition to "ac-Barring For MO-Data", "ac-Barring For MO-Signalling", "SSAC For MMTEL-Voice", "SSAC for MMTEL-Video", access barring information for CSFB, and access barring information for MTC in a subordinate cell.

Here, the "ac-Barring (ACB) For TYPE x" may include "ac-Barring For Special AC", "ac-Barring Factor", and "ac-Barring Time" similarly to the "ac-Barring For MO-Data", etc.

Note that the "ac-Barring For Special AC" is information indicating which mobile station UE of ACs (Access Classes) 11 to 15 should be made an access barring object, and, for example, is composed of 5 bits.

Here, "Access Class" is a kind of contract held in a USIM (Universal Subscriber Identifier Module) which is used with being inserted into the mobile station UE. The ACs 11 to 15 indicate preferential users.

Further, either one of ACs 0 to 9 is held in the USIM which is used with being inserted into the mobile station UE, and when ACs 11 to 15 are not held in the USIM, the mobile station UE is regarded as a general user. Here, the mobile station UE into which the USIM for the general user is inserted may be configured to ignore the "ac-Barring For Special AC" in a barring determination process described later.

Further, the "ac-Barring Factor" can be set with the value of the range of 0 to 100, and the "ac-Barring Time" can be set with the time for performing an access barring (the set time of a T303 timer or a T305 timer).

Figure 2:
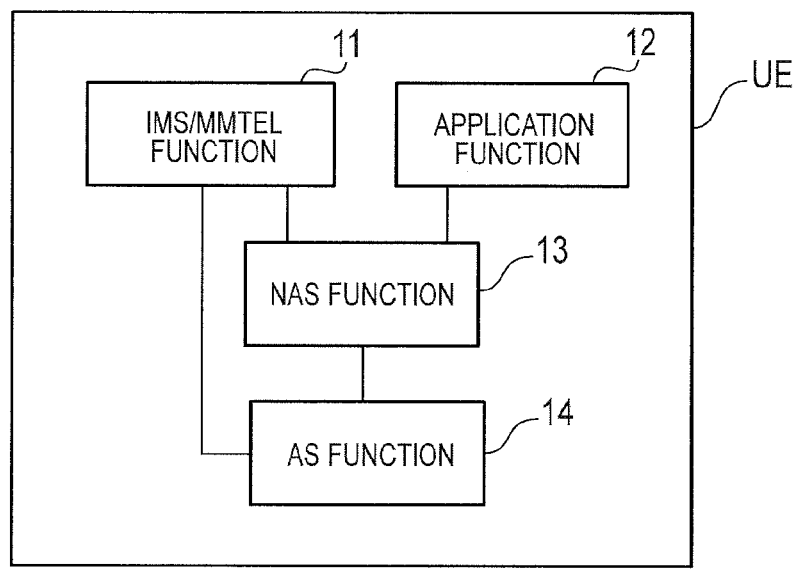
FIG. 2 is a functional block diagram of a mobile station according to the first embodiment of the present invention.

As shown in FIG. 2, the mobile station UE includes an IMS/MMTEL function 11, an application function 12, a NAS (Non Access Stratum) function 13, and an AS function 14.

The IMS/MMTEL function 11 plays a role of an IMS/MMTEL layer, and is configured to transmit originating call requests of the MMTEL-Voice and MMTEL-Video, to the NAS function 13.

The application function 12 plays a role of an application layer other than the IMS/MMTEL layer, and is configured to transmit the originating call request of an application controlled by the application layer, to the NAS function 13.

The NAS function 13 is configured to play a role (Attach control, location registration control, originating and terminating control, etc.) of a NAS layer.

Further, the NAS function 13 is configured such that when the originating call request is received from the IMS/MMTEL function 11 and the application function 12, a type (service type) of an EPS bearer set to a destination APN of the originating call request is specified, and the originating call request including "Type Indicator" indicating a type of the EPS bearer set to a specified destination APN is transmitted to the AS function 14.

The AS function 14 is configured to play a role (radio originating and terminating control, radio resource control, radio measurement control, etc.) of an AS/RRC (Radio Resource Control) layer.

Specifically, the AS function 14 is configured to receive broadcast information transmitted by the radio base station eNB in the standby cell.

For example, the AS function 14 is configured to receive the "ac-Barring (ACB) For TYPE x" in addition to the "ac-Barring For MO-Data", the "ac-Barring For MO-Signalling", the "SSAC For MMTEL-Voice", the "SSAC For MMTEL-Video", the access barring information for CSFB, and the access barring information for MTC in the standby cell.

Further, the AS function 14 is configured to determine whether the originating call request is transmitted or not depending on whether the "ac-Barring For TYPE x" corresponding to the type of the EPS bearer set to the destination APN of the originating call request received from the NAS function 13 is broadcasted or not in the standby cell.

That is, the AS function 14 is configured to determine whether the originating call request is transmitted or not on the basis of the type indicated by the "Type Indicator" included in the originating call request received from the NAS function 13 and the "ac-Barring For TYPE x" which is broadcasted in the standby cell.

Note that the AS function 14 is configured to perform the above described determination when the mobile station UE transits from an idle state to a connected state.

Further, the AS function 14 may be configured to perform the above described determination depending on the type of the EPS bearer when the mobile station UE in the connected state newly requires the setting of DRB depending on the EPS bearer.

An example of an operation of the mobile communication system according to the first embodiment of the present invention will be described below with reference to FIG. 3.

Figure 3:
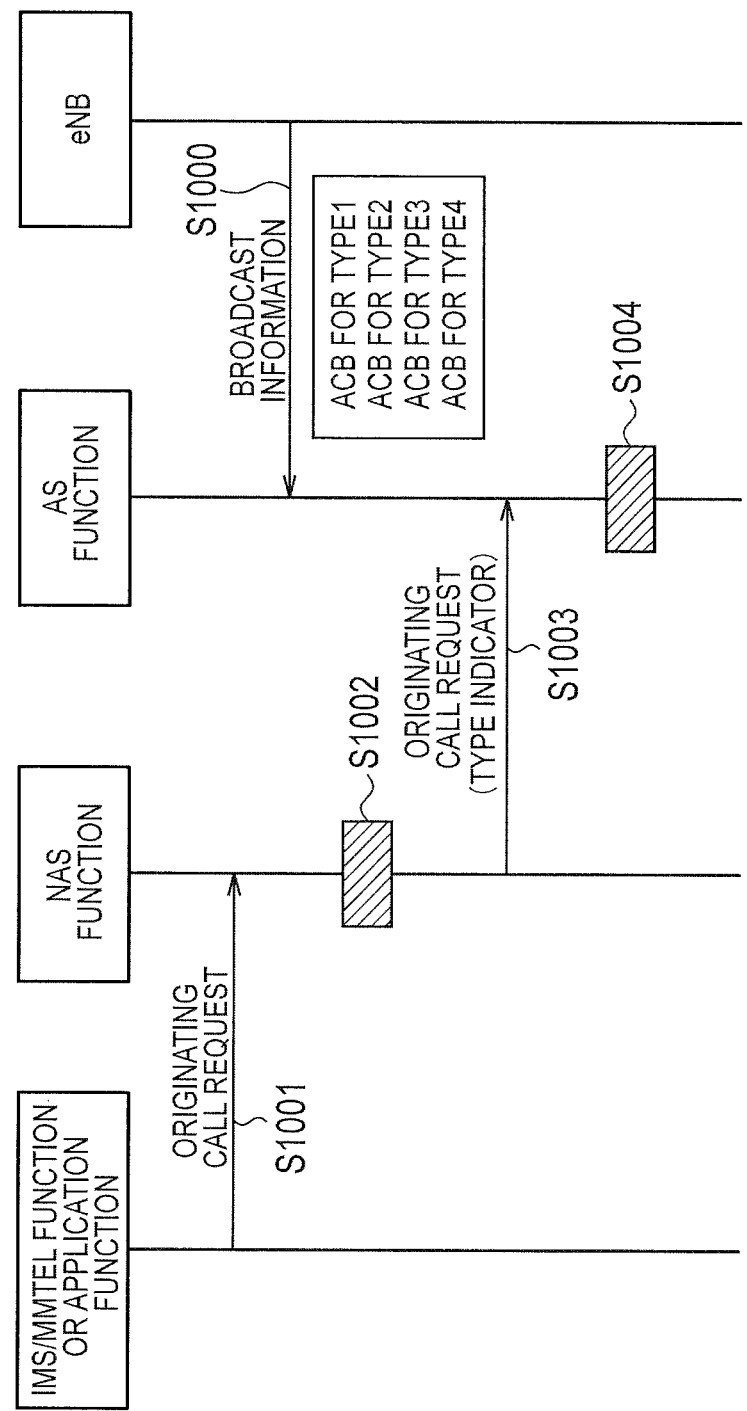
FIG. 3 is a sequence diagram showing an operation of the mobile communication system according to the first embodiment of the present invention.

As shown in FIG. 3, in step S1000, the AS function 14 of the mobile station UE receives the broadcast information, for example, the "ac-Barring For TYPE x" broadcasted by the radio base station eNB in the standby cell.

In step S1001, the IMS/MMTEL function 11 or the application function 12 of the mobile station UE transmits the originating call request to the NAS function 13 of the mobile station UE.

The NAS function 13 specifies a type of the EPS bearer set to the destination APN of the originating call request in step S1002, and in step S1003, transmits the originating call request including the "Type Indicator" indicating the type of the EPS bearer, to the AS function 14.

In step S1004, the AS function 14 determines whether the originating call request is transmitted or not depending on whether the "ac-Barring For TYPE x" corresponding to the type of the EPS bearer set to the destination APN of the originating call request received from the NAS function 13 is broadcasted or not in the standby cell.

The AS function 14 transmits the originating call request to the radio base station eNB when it is determined that the "ac-Barring For TYPE x" corresponding to the type of the EPS bearer set to the destination APN of the originating call request received from the NAS function 13 is not broadcasted in the standby cell.

On the other hand, the AS function 14 performs the barring determination process corresponding to the broadcasted "ac-Barring For TYPE x" when it is determined that the "ac-Barring For TYPE x" corresponding to the type of the EPS bearer set to the destination APN of the originating call request received from the NAS function 13 is broadcasted in the standby cell, and as a result, when it is determined that the barring is in place, does not transmit the originating call request to the radio base station eNB.

The barring determination process may be performed on the basis of a bit map of the "ac-Barring For Special AC" or may be performed by comparing the "ac-Barring Factor" with a random number.

Further, the AS function 14 may determine that the barring is in place when a predetermined timer based on the "ac-Barring Time" is being activated by determining that the barring is in place in the previous barring determination process regardless whether the "ac-Barring For TYPE x" is broadcasted or not in the barring determination process.

Here, the type of the EPS bearer is designated from a network to the mobile station UE when a context of the EPS bearer is prepared. For example, the type of the EPS bearer is designated from the network to the mobile station UE when the mobile station UE performs Attach or when the mobile station UE or the network prepares the EPS bearer.

Specifically, the type is designated from the mobile management node MME to the mobile station UE for each EPS bearer by using a NAS protocol.

For example, the type may be designated from the MME to the mobile station UE by using a procedure such as "PDN Connectivity Request" and "EPS bearer Context Modification".

Based on the mobile communication system according to the first embodiment of the present invention, the access barring of the mobile station UE can be performed corresponding to the type of the EPS bearer set to the destination APN of the originating call request.

Particularly, it is possible to prevent a number of mobile stations UE from simultaneously performing the originating call request to the APN server, when a fault occurs in a specific APN server, as a result of which it is possible to prevent unnecessary congestion of the network.

First Modification

A mobile communication system according to a first modification of the present invention will be described below with reference to FIG. 4 with focusing difference with the mobile communication system according to the first embodiment.

The AS function 14 of the mobile station UE according to the first modification is configured to notify the NAS function 13 of the "ac-Barring For TYPE x" broadcasted in a standby cell.

Here, the AS function 14 may notify the NAS function 13 of the "ac-Barring For TYPE x" by transmitting the broadcasted "ac-Barring For TYPE x" itself, to the NAS function 13.

Alternatively, the AS function 14 may notify the NAS function 13 of the "ac-Barring For TYPE x" by transmitting predetermined information calculated on the basis of the broadcasted "ac-Barring For TYPE x", to the NAS function 13.

Further, the NAS function 13 of the mobile station UE according to the first modification is configured to determine whether the originating call request is transmitted or not on the basis of the type of an EPS bearer set to a destination APN of the originating call request received from the IMS/MMTEL function 11 and the application function 12 and the notified "ac-Barring For TYPE x".

An example of an operation of the mobile communication system according to the first modification will be described below with reference to FIG. 4.

As shown in FIG. 4, in step S2000, the AS function 14 of the mobile station UE receives broadcast information broadcasted by the radio base station eNB, for example, "ac-Barring For TYPE x" in the standby cell.

In step S2001, the IMS/MMTEL function 11 or the application function 12 of the mobile station UE transmits the originating call request to the NAS function 13 of the mobile station UE.

In step S2002, the NAS function 13 notifies the AS function 14 that the originating call request is received.

In step S2003, the AS function 14 transmits a parameter for notifying the NAS function 13 of the "ac-Barring For TYPE x" broadcasted in the standby cell.

In step S2004, the NAS function 13 determines whether the originating call request is transmitted or not on the basis of the "ac-Barring For TYPE x" corresponding to the type of the EPS bearer set to a destination APN of the originating call request received from the NAS function 13 in the standby cell.

The NAS function 13 transmits the originating call request to the AS function 14 when it is determined that the "ac-Barring For TYPE x" corresponding to the type of the EPS bearer set to the destination APN of the originating call request received from the IMS/MMTEL function 11 or the application function 12 is not broadcasted in the standby cell.

On the other hand, the NAS function 13 performs barring determination process corresponding to the broadcasted "ac-Barring For TYPE x" when it is determined that the "ac-Barring For TYPE x" corresponding to the type of the EPS bearer set to the destination APN of the originating call request received from the IMS/MMTEL function 11 or the application function 12 is broadcasted in the standby cell, and when it is determined, as a result of, that the barring is in place, does not transmit the originating call request to the AS function 14.

Note that the barring determination process may be performed by the IMS/MMTEL function 11 or the application function 12 instead of the NAS function 13. In this case, the AS function 14 or the NAS function 13 notifies the IMS/MMTEL function 11 or the application function 12 of the "ac-Barring For TYPE x" corresponding to the type of the EPS bearer.

The above described features of the present embodiment may be expressed as follows.

A first characteristic of the present embodiment is summarized as a mobile communication method in a mobile communication system configured to be capable of setting an EPS bearer (service bearer) for each APN (access point) between a mobile station UE and a gateway device P/S-GW, includes a step A of broadcasting, by a radio base station eNB, "ac-Barring For TYPE x (type-specific access information)" for barring an access by each type of the EPS bearer in a subordinate cell, and a step B of determining, by the mobile station UE, whether an originating call request is transmitted or not depending on whether the "ac-Barring For TYPE x" corresponding to the type of the EPS bearer set to a destination APN of the originating call request is broadcasted or not in a standby cell.

In the first characteristic of the present embodiment, the step B may include a step of notifying, by a NAS function 13 of the mobile station UE, an AS function 14 of the mobile station UE of the type of the EPS bearer set to the destination APN of the originating call request and a step of determining, by the AS function 14 of the mobile station UE, whether the originating call request is transmitted or not on the basis of a notified type and the "ac-Barring For TYPE x" broadcasted in the standby cell.

In the first characteristic of the present embodiment, the step B may include a step of notifying, by the AS function 14 of the mobile station UE, the NAS function 13 of the mobile station UE of the "ac-Barring For TYPE x" broadcasted in the standby cell and a step of determining, by the NAS function 13 of the mobile station UE, whether the originating call request is transmitted or not on the basis of the type of the EPS bearer set to the destination APN of the originating call request and the notified "ac-Barring For TYPE x".

In the first characteristic of the present embodiment, the mobile communication method may include a step of designating, by a mobile management node MME (network), the type of the EPS bearer, to the mobile station UE when a context of the EPS bearer is prepared.

A second characteristic of the present embodiment is summarized as a mobile station UE configured to be capable of setting an EPS bearer for each APN between a gateway device P/S-GW and the mobile station UE, is configured to receive "ac-Barring For TYPE x" for barring an access by a type of an EPS bearer broadcasted in a standby cell and configured to determine whether the originating call request is transmitted or not depending on whether the "ac-Barring For TYPE x" corresponding to the type of the EPS bearer set to a destination APN of the originating call request is notified or not in the standby cell.

The second characteristic of the present embodiment is that there are provided an AS function 14 and a NAS function 13. The NAS function 13 is configured to notify the AS function 14 of the type of the EPS bearer set to the destination APN of the originating call request, whereas the AS function 14 is configured to receive the "ac-Barring For TYPE x". The AS function 14 may be configured to determine whether the originating call request is transmitted or not on the basis of the notified type and the "ac-Barring For TYPE x" broadcasted in the standby cell.

The second characteristic of the present embodiment is that there are provided the AS function 14 and the NAS function 13. The AS function 14 is configured to receive the "ac-Barring For TYPE x", and is configured to notify the NAS function 13 of the "ac-Barring For TYPE x" broadcasted in the standby cell, whereas the NAS function 13 may be configured to determine whether the originating call request is transmitted or not on the basis of the type of the EPS bearer set to the destination APN of the originating call request and the notified "ac-Barring For TYPE x".

In the second characteristic of the present embodiment, the NAS function 13 may be configured to designate the type of the EPS bearer from a mobile management node MME when the context of the EPS bearer is prepared.

In addition, the operation of the above-mentioned radio base station eNB or mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the radio base station eNB and the mobile station UE. Furthermore, such a storage medium and processor may be arranged in the radio base station eNB and the mobile station UE as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST eNB . . . Radio base station
UE . . . Mobile station
11 . . . IMS/MMTEL function
12 . . . Application function
13 . . . NAS function
14 . . . AS function

The invention claimed is:

1. A mobile communication method in a mobile communication system configured to be capable of setting, between a mobile station and a gateway device, a service bearer for each access point to a Packet Data Network, comprising:
   a step A of broadcasting, by a radio base station, type-specific access information for barring an access to the access point via the radio base station by each type of the service bearer in a subordinate cell, and
   a step B of determining, by the mobile station, whether an originating call request is transmitted or not depending on whether the type-specific access information is broadcasted or not in the cell, wherein
   the type-specific access information corresponds to a type of the service bearer set to a destination access point of the originating call request.

2. The mobile communication method according to claim 1, wherein
   the step B comprises:
      a step of notifying, by a NAS function of the mobile station, an AS function of the mobile station, of the type of the service bearer set to the destination access point of the originating call request; and
      a step of determining, by the AS function of the mobile station, whether the originating call request is transmitted or not on the basis of the notified type and the type-specific access information broadcasted in the cell.

3. The mobile communication method according to claim 1, wherein
   the step B comprises:
      a step of notifying, by an AS function of the mobile station, an NAS function of the mobile station, of the type-specific access information broadcasted in the cell; and
      a step of determining, by the NAS function of the mobile station, whether the originating call request is transmitted or not on the basis of the type of the service bearer set to the destination access point of the originating call request and the notified type-specific access information.

4. The mobile communication method according to claim 1, wherein the method comprises a step of designating, by a network, the type of the service bearer, to the mobile station when a context of the service bearer is prepared.

5. A mobile station configured to be capable of setting a service bearer for each access point to a Packet Data Network between a mobile station and a gateway device, wherein
   the mobile station is configured to receive type-specific access information for barring an access to the access point via the radio base station by each type of the service bearer broadcasted in a standby cell, and is configured to determine whether an originating call request is transmitted or not depending on whether type-specific access information in the standby cell is notified or not, wherein the type-specific access information corresponds to a type of the service bearer set to a destination access point of the originating call request.

6. The mobile station according to claim 5, comprising:

an AS function and a NAS function, wherein the NAS function is configured to notify the AS function of the type of the service bearer set to the destination access point of the originating call request, the AS function is configured to receive the type-specific access information, and the AS function is configured to determine whether the originating call request is transmitted or not on the basis of the notified type and the type-specific access information broadcasted in the standby cell.

7. The mobile station according to claim 5, comprising:

an AS function and a NAS function, wherein the AS function is configured to receive the type-specific access information, and the AS function is configured to notify the NAS function of the type-specific access information broadcasted in the standby cell, and the NAS function is configured to determine whether the originating call request is transmitted or not on the basis of the type of the service bearer set to the destination access point of the originating call request and the notified type-specific access information.

8. The mobile station according to claim 5, wherein the type of the service bearer is configured to be designated from a network when a context of the service bearer is prepared.

* * * * *